US012278734B2

(12) United States Patent
Karabey et al.

(10) Patent No.: US 12,278,734 B2
(45) Date of Patent: Apr. 15, 2025

(54) BLOCKCHAIN AND CLOUD CONNECTIVITY-BASED SELF-REGISTRATION AND INVENTORYING OF ENTERPRISE IoT ASSETS

(71) Applicant: Microsoft Technology Licensing, LLC, Redmond, WA (US)

(72) Inventors: Bugra Karabey, Redmond, WA (US); Andre Oneal Alfred, Redmond, WA (US); Tvisha Rajesh Gangwani, Philadelphia, PA (US); Priyatham Reddy Allala, Monroe, WA (US); Sasikumar Natarajan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/102,193

(22) Filed: Jan. 27, 2023

(65) Prior Publication Data

US 2024/0259269 A1 Aug. 1, 2024

(51) Int. Cl.
*H04L 41/12* (2022.01)
*G06Q 10/087* (2023.01)

(52) U.S. Cl.
CPC .......... *H04L 41/12* (2013.01); *G06Q 10/087* (2013.01)

(58) Field of Classification Search
CPC ....... H04L 41/12; H04L 67/12; H04L 67/125; H04L 41/08; H04L 41/0806;

(Continued)

(56) References Cited

U.S. PATENT DOCUMENTS 10,721,274 B1 * 7/2020 Prasad ................ H04L 43/0817
10,755,226 B1 * 8/2020 Robyak ................ G06Q 10/087

(Continued)

FOREIGN PATENT DOCUMENTS

CN 111738639 A 10/2020
WO 2019152114 A2 8/2019

(Continued)

OTHER PUBLICATIONS

Bashir, Imran, "Mastering Blockchain", Packt Publishing Ltd, Mar. 17, 2017, 531 Pages.

(Continued)

*Primary Examiner* — Greg C Bengzon
(74) *Attorney, Agent, or Firm* — Shook, Hardy & Bacon L.L.P.

(57) ABSTRACT

Embodiments provide for the self-registration and automatic inventorying of enterprise Internet-of-Things (IoT) devices in an enterprise environment. An asset inventory agent on a network among many networks (i.e., within the enterprise environment) can receive a data packet from a computing device. The data packet is communicated via the network shared between the asset inventory agent and the computing device. The asset inventory agent can analyze the data packet, which can reveal a communication protocol associated with the computing device. A discovery rule associated with the protocol can be selected to extract inventory information from the data packet. The inventory information can be utilized to generate a distributed ledger transaction, which is communicated to a set of nodes adapted to collectively store the inventory information associated with the computing device onto the distributed ledger.

17 Claims, 6 Drawing Sheets

(58) Field of Classification Search
CPC ............... H04L 41/084; H04L 41/0843; H04L 41/0846; H04L 41/0895; H04L 12/2816; H04L 41/0853; H04L 41/085; H04L 43/026; H04L 43/06; H04L 63/0227; H04L 63/1408; H04L 63/1425; H04L 67/02; H04L 67/04; H04L 67/10; H04L 67/1061; G06Q 10/087; H04W 4/70; H04W 4/38; H04W 12/122; H04W 84/18; H04W 12/009; H04W 4/30; H04W 4/33
See application file for complete search history.

(56) References Cited

U.S. PATENT DOCUMENTS

| | | | | |
|---|---|---|---|---|
| 10,778,539 | B1* | 9/2020 | Hussain | H04L 41/22 |
| 10,943,465 | B1* | 3/2021 | Le | H04N 17/002 |
| 11,055,703 | B2* | 7/2021 | Kondo | H04L 63/123 |
| 11,088,916 | B1* | 8/2021 | Chandrashekhar | H04L 41/122 |
| 11,245,577 | B2* | 2/2022 | Behm | H04L 41/12 |
| 11,290,330 | B1* | 3/2022 | Kothuri | H04L 41/082 |
| 11,349,926 | B1* | 5/2022 | Wang | H04L 63/12 |
| 11,418,322 | B2* | 8/2022 | Verma | H04L 9/0643 |
| 11,438,386 | B2* | 9/2022 | Brannon | G06F 15/76 |
| 11,537,985 | B2 | 12/2022 | Ramos | |
| 2007/0069018 | A1* | 3/2007 | Dearing | G07G 1/0045 340/10.1 |
| 2013/0346260 | A1* | 12/2013 | Jubran | G06Q 10/087 705/28 |
| 2014/0101467 | A1* | 4/2014 | Jubran | H04L 41/344 709/224 |
| 2017/0317882 | A1* | 11/2017 | Bitincka | H04L 67/34 |
| 2018/0367412 | A1* | 12/2018 | Sethi | H04L 43/20 |
| 2019/0052554 | A1* | 2/2019 | Mukerji | H04L 41/0893 |
| 2019/0236527 | A1* | 8/2019 | Bhaumik | G06Q 10/087 |
| 2019/0266553 | A1* | 8/2019 | Jacobson | G06Q 10/087 |
| 2019/0295029 | A1* | 9/2019 | Weber | G06Q 10/087 |
| 2019/0317935 | A1* | 10/2019 | Berti | G06F 16/27 |
| 2019/0354922 | A1* | 11/2019 | Berti | G06K 7/1417 |
| 2019/0363884 | A1 | 11/2019 | Johnson | |
| 2019/0373472 | A1* | 12/2019 | Smith | H04W 12/108 |
| 2020/0213193 | A1* | 7/2020 | Newell | H04W 8/18 |
| 2020/0285635 | A1* | 9/2020 | Roets | G06F 21/64 |
| 2020/0364817 | A1* | 11/2020 | Liu | G06F 16/27 |
| 2020/0389309 | A1* | 12/2020 | Ricotta | H04L 9/3239 |
| 2020/0402190 | A1* | 12/2020 | Nelluri | H04W 4/70 |
| 2021/0004794 | A1* | 1/2021 | Kumar Kumaresan | G06Q 30/0645 |
| 2021/0067536 | A1* | 3/2021 | Mylrea | H04L 9/3239 |
| 2021/0117933 | A1* | 4/2021 | Lobner | G06Q 10/063114 |
| 2021/0264419 | A1* | 8/2021 | Ratakonda | G06Q 20/389 |
| 2021/0304120 | A1* | 9/2021 | Hill | G06F 16/27 |
| 2021/0350314 | A1* | 11/2021 | Andersen | G06Q 10/087 |
| 2021/0360070 | A1* | 11/2021 | Cella | H04L 67/565 |
| 2022/0066751 | A1* | 3/2022 | Yan | G06F 8/41 |
| 2022/0101245 | A1* | 3/2022 | Daley | G06F 16/953 |
| 2022/0272005 | A1* | 8/2022 | Pandian | H04L 61/2514 |
| 2022/0276996 | A1* | 9/2022 | Gaur | G06Q 20/401 |
| 2022/0351122 | A1* | 11/2022 | Shi | G16H 40/20 |
| 2022/0393873 | A1* | 12/2022 | Holland | G06Q 20/02 |
| 2022/0405750 | A1* | 12/2022 | Fallah | H04L 9/14 |
| 2023/0004627 | A1* | 1/2023 | Holland | G06F 21/105 |
| 2023/0095965 | A1* | 3/2023 | Mee | H04L 9/0643 713/168 |
| 2023/0102048 | A1* | 3/2023 | Cella | B25J 9/1661 700/248 |
| 2023/0129559 | A1* | 4/2023 | Higgins | H04L 9/3297 707/703 |
| 2023/0222531 | A1* | 7/2023 | Cella | G06Q 10/06375 705/7.31 |
| 2023/0230091 | A1* | 7/2023 | Vaughn | G06Q 20/4016 705/71 |

FOREIGN PATENT DOCUMENTS

| | | | |
|---|---|---|---|
| WO | 2021179705 | A1 | 9/2021 |
| WO | 2022155231 | A1 | 7/2022 |

OTHER PUBLICATIONS

International Search Report and Written Opinion received for PCT Application No. PCT/US2024/010971, Mar. 26, 2024, 15 pages.
Košťál, et al., "Management and monitoring of IoT devices using blockchain.", Sensors, vol. 19, No. 4, Feb. 19, 2019, 12 Pages.

* cited by examiner

BLOCKCHAIN AND CLOUD CONNECTIVITY-BASED SELF-REGISTRATION AND INVENTORYING OF ENTERPRISE IoT ASSETS

BACKGROUND

IT asset inventory systems are computer-based systems used to track and manage the hardware and software assets within an organization. These systems typically include a database that stores information about each asset, such as the asset's type, model, serial number, location, and ownership. The main purpose of IT asset inventory systems is to help organizations keep track of their assets and optimize their IT infrastructure.

To use an IT asset inventory system, an organization must first identify and catalog all of its assets. This process can be done manually, by physically inspecting each asset and entering its information into the system, or it can be done automatically using tools such as barcode scanners or network discovery tools. Once the assets have been catalogued, the IT asset inventory system can be used to track and manage the assets in various ways, including monitoring their location and status, tracking their deployment, or scheduling maintenance, among other things.

SUMMARY

Embodiments of the present disclosure generally relate to a blockchain-based IT asset inventory system. More specifically, embodiments describe an IT asset inventory system and automated techniques for facilitating protocol-agnostic Internet of Things (IoT), Industrial Internet of Things (IIoT), and Operational Technology (OT) device registration and tracking on a distributed ledger.

At a high level, a network, such as one associated with an organization or entity, can include a plurality of IoT, IIoT, or OT devices operable to generate communication data, such as network data packets, which are transmitted across a network to facilitate inter-device communication. Typically, the devices in a particular location are associated with a particular network or segment (e.g., subnet) thereof. Because large enterprises may have multiple facilities or segments in various locations, the ability to identify, register, track, inventory, or deprecate such assets (e.g., IoT, IIoT, OT devices) in a homogenous manner can be extremely challenging.

In accordance with various embodiments of the present disclosure, an IT asset inventory agent can receive data packets from a computing asset (e.g., an IoT, an IIoT, or OT device) on a network. The IT asset inventory agent can analyze the data packets to select, from a plurality of discovery rule sets, a particular discovery rule set that is associated with the communication protocol. Utilizing the selected discovery rule set, the IT asset inventory agent can extract, from the data packets, relevant pieces of inventory information associated with the computing asset.

The IT asset inventory agent can include an asset inventory management component that utilizes an IT asset inventory blockchain, which is accessible across all enterprise facilities, for storing IT asset information (i.e., inventory information) and updating asset status. In this regard, the asset inventory management component can search the IT asset inventory blockchain to determine whether the computing asset (in other words, its inventory information) has been registered on the blockchain, or whether the computing asset has an "active" or "inactive" (or deprecated) device status, among other things.

In various embodiments, the asset inventory management component can generate transactions to update the IT asset inventory blockchain with inventory information (e.g., for registering or updating a computing device), or to update the IT asset inventory blockchain with more recent device status (e.g., "active" or "inactive") for the computing device. In some embodiments, the transactions can be digitally signed by the asset inventory management component and communicated to one or more nodes that collectively maintain the IT asset inventory blockchain.

In some embodiments, when a computing device is first registered to the IT asset inventory blockchain (i.e., the blockchain has no record of inventory information associated with the computing device), the asset inventory management component can generate a smart contract for the computing device. The smart contract can include the information associated with the computing asset, and can also include a state variable that assigns the device status of the computing device as "active." The asset inventory management component can transmit or otherwise deploy the smart contract by communicating a transaction including the smart contract to the one or more nodes for storage onto the blockchain. In this way, the asset inventory management component can simply update the device status of a computing device by interacting with the smart contract associated with the computing device. As will be described, the asset inventory management component can include additional management logic to actively or passively detect device health state and update or otherwise deprecate the device status of any computing device that has been determined inactive for an extended period of time.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

Figure 1:
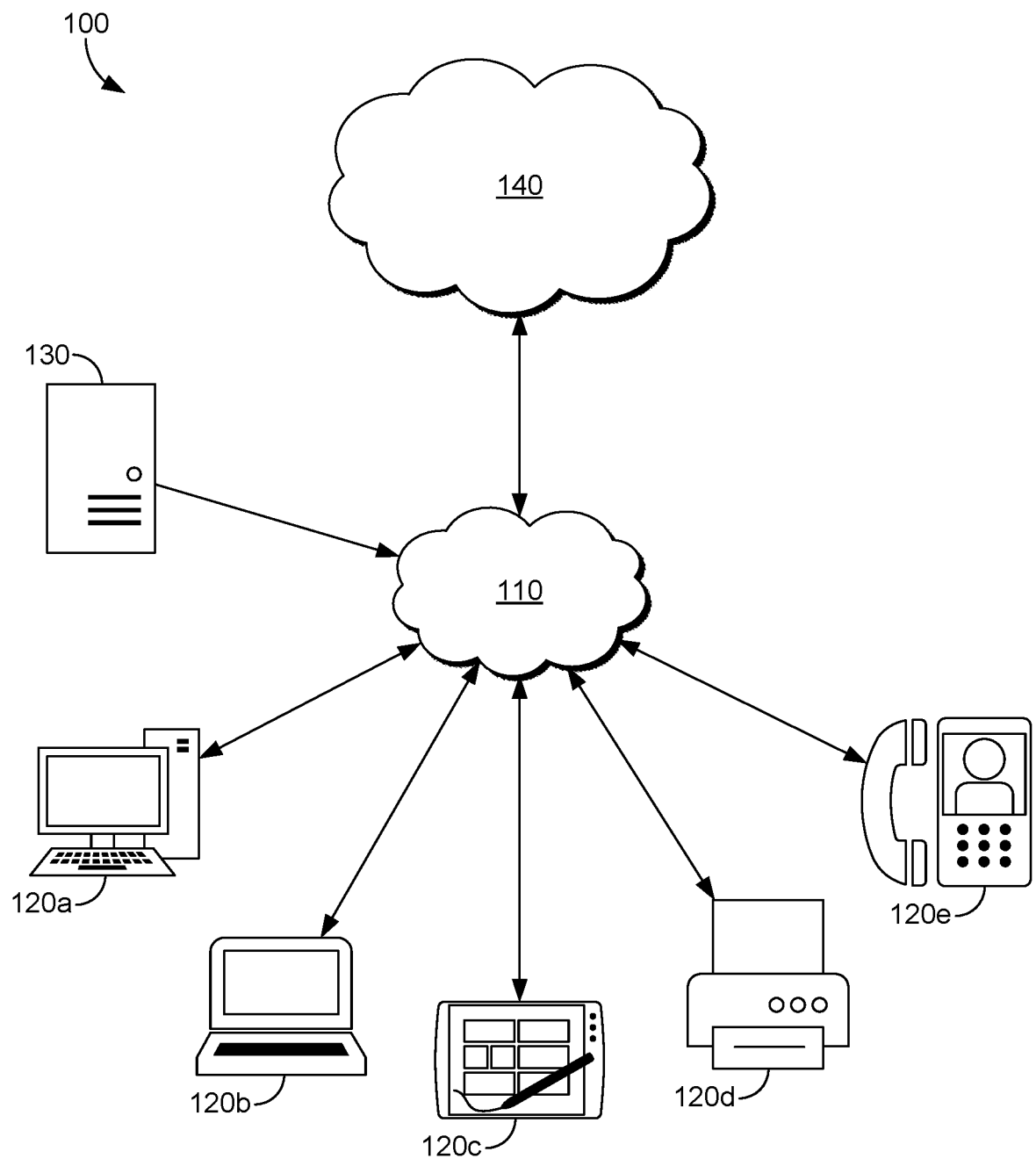
FIG. 1 is an exemplary operating environment in accordance with some embodiments of the present disclosure.

IT asset inventory systems are ubiquitous in the field of information technology to track and manage the physical and software assets of an organization. Such systems have been employed to manage and maintain a wide variety of devices, including computers, servers, mobile devices, Internet of Things (IoT) devices, Industrial Internet of Things (IIoT) devices, and Operational Technology (OT) devices, among other things. One of the significant benefits of an IT asset inventory system is the ability to provide a centralized and accurate view of an organization's assets, which enables the efficient management and maintenance of such assets.

In the context of IoT, IIoT, or OT devices (collectively referred to herein as enterprise IoT devices) an IT asset inventory system allows an organization to effectively manage a large number of devices having various functionalities and serving many purposes. These systems provide a number of functionalities that are critical for the effective management of such devices, including: device tracking, which allows an organization to keep track of which devices are connected to the network and where they are located; performance monitoring, which enables an organization to identify any issues or opportunities for optimization with their enterprise IoT devices; upgrade and replacement planning, which helps to minimize disruptions to operations by allowing organizations to plan for future upgrades and replacements of their enterprise IoT devices; or compliance management, which ensures that an organization's enterprise IoT devices are compliant with industry regulations and security standards.

The use of IT asset inventory systems can be an essential tool in the management of enterprise IoT devices within an organization. Such systems can provide a centralized and accurate view of an organization's assets, which enables the efficient management and maintenance of these assets, including the reduction of downtime and security risks. While conventional IT asset inventory systems can be extremely useful for the management and organization of enterprise IoT devices within an organization, larger enterprises having multiple enterprise IoT devices spread across multiple facilities can pose challenges to these systems. Some of the shortcomings of IT asset inventory systems can be exaggerated when viewed through the lens of multi-facility enterprises. The process of registering an enterprise IoT device, as well as continuously tracking, updating, and deprecating such assets in an IT asset inventory system is typically governed and implemented via certain manual activities or workstreams. This can result in errors or inconsistencies in device inventory-specifically, devices can appear missing, stale, duplicated, or orphaned, and can pose major security issues, not to mention disrupting operational efficiencies. Also, because multi-facility environments may utilize disparate databases or systems to host such IT asset inventory systems, the disparity can again result in missing, duplicate, stale, or orphaned devices, similarly posing major security issues and inefficiencies. Naturally, the greater the number of facilities and environments in which conventional IT asset inventory system are configured, the more the security issues and inefficiencies compound.

Embodiments described herein are directed to addressing the above-noted issues relating to conventional IT asset inventory systems in small-to-large scale enterprise environments. At a high level, systems and techniques are described for automatically tracking or otherwise automatically inventorying enterprise IoT devices across one or more networks associated with an organization.

In various embodiments, a network, such as one associated with an organization or entity, can include a plurality of devices that are operable to generate communication data, such as network data packets, which are transmitted across the network to facilitate inter-device communication. These devices may be located in various facilities or segments of a network, and managing and tracking these devices can be challenging.

In some aspects, an IT asset inventory agent associated with the organization can receive data packets from devices on a network. The IT asset inventory agent can analyze the data packets to select a particular discovery rule set that is associated with the communication protocol. Utilizing the selected discovery rule set, the agent can extract relevant pieces of inventory information associated with the device. The IT asset inventory agent can also include an asset inventory management component that utilizes an IT asset inventory blockchain, accessible across all enterprise facilities, for storing IT asset information (i.e., inventory information) and updating device status. The asset inventory management component can search the IT asset inventory blockchain to determine whether the device (in other words, its inventory information) has been registered on the blockchain, or whether the device has an "active" or "inactive" (or deprecated) device status, among other things. The asset inventory management component can generate transactions to update the IT asset inventory blockchain with new records storing inventory information (e.g., for registering or updating a device), or to update existing records in the IT asset inventory blockchain with a recent device status (e.g., "active" or "inactive") for the device. In some aspects, the transactions can be digitally signed or otherwise authenticated by the asset inventory management component and communicated to one or more nodes that collectively maintain the IT asset inventory blockchain.

In some aspects, when a device is first registered to the IT asset inventory blockchain (i.e., the blockchain has no record of inventory information associated with the device), the asset inventory management component can generate a smart contract for the device. The smart contract can include the inventory information associated with the device, and can also include a state variable that assigns the device status (e.g., "active", "inactive", "deprecated") of the device. The asset inventory management component can transmit or otherwise deploy the smart contract by communicating a transaction including the smart contract to the one or more nodes for storage onto the blockchain. In this way, the asset inventory management component can simply update the device status of a device by interacting with the smart contract associated with the device. The asset inventory management component can also include additional management logic to actively or passively detect device health state and update or otherwise deprecate the device status of any device that has been determined inactive for an extended period of time.

Turning now to FIG. 1, a schematic depiction is provided illustrating an exemplary operating environment 100 in which some embodiments of the present disclosure may be employed. It should be understood that this and other arrangements described herein with respect to any of the figures are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The exemplary operating environment 100 depicted in FIG. 1 includes one or more enterprise IoT devices, such as enterprise IoT devices 120a, 120b, 120c, 120d, 120e. While the exemplary enterprise IoT devices depicted in FIG. 1 illustrate a variety of computing devices or other devices with processors and networking components, it is contemplated that enterprise IoT devices 120a, 120b, 120c, 120d, 120e can include any IoT, IIoT, or OT device, each in wired or wireless communication with an internal network 110, in accordance with the present disclosure. As described herein, an internal network 110 can include a LAN, a hub (e.g., a IoT hub), or any combination thereof to facilitate a networked environment otherwise referred to herein as the internal network 110. The exemplary operating environment 100 further includes one or more asset inventory agents, such as asset inventory agent 130, connected to the internal network 110. The internal network 110 can also be connected to a wide area network 140, such as the Internet, which facilitates communications between the asset inventory agent 130 and other computing devices that may be external to the internal network 110.

At a high level, any one of enterprise IoT devices 120a, 120b, 120c, 120d, 120e, can transmit a data packet, or otherwise communicate one or more pieces of data, to any other computing device within the internal network 110 or outside the internal network 110 (e.g., via wide area network 140). In this regard, the asset inventory agent 130 can monitor, detect, listen to, intercept, sniff, or otherwise receive the data packet from the transmitting enterprise IoT device, to perform inventory management of the enterprise IoT device based on the data packet(s) received therefrom. While not depicted here, it is contemplated that the internal network 110 can include one or more controller(s) or hub(s) for enterprise IoT devices, which can facilitate communications between such enterprise IoT devices and the internal network 110 and/or wide area network 140. It is also contemplated that in some aspects, an asset inventory agent 130 can be coupled to or integrated with such a controller or hub to accomplish the various techniques described herein.

As will be described herein, inventory management of an enterprise IoT device can include registering the device (e.g., detecting and logging the existence and attributes of the device on the network), monitoring and tracking a status of the device (e.g., tracking a health state or heartbeat of the device), updating attributes of the device (e.g., updating location, IP address, subnet address), or deprecating the device (e.g., flagging the device as expired or unapproved). In accordance with various embodiments described herein, one or more asset inventory agents, such as asset inventory agent 130, can automatically perform such inventory management tasks utilizing a distributed ledger and various techniques described herein. As will be described, the distributed ledger can provide the asset inventory agent 130 with a decentralized, immutable, and reliable data source that is comprehensive of all inventory across an organization and widely accessible across various locations of the organization.

Figure 2:
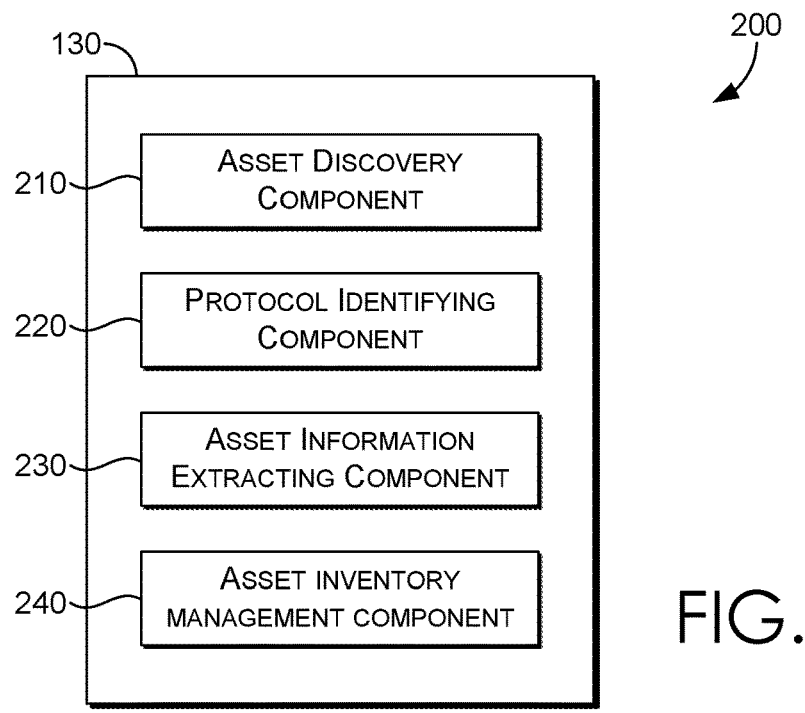
FIG. 2 is a block diagram of an exemplary asset inventory agent in accordance with some embodiments of the present disclosure.

Looking now to FIG. 2, a block diagram 200 is provided illustrating an exemplary asset inventory agent 130 in accordance with some embodiments of the present disclosure. It is noted the following description is provided merely as an example having an exemplary set or combination of components, the configuration of which is not intended to be limiting. The asset inventory agent 130 described herein can embody or include at least one computing device, as described in accordance with FIG. 7. As depicted, the asset inventory agent 130 includes an asset discovery component 210, a protocol identifying component 220, an asset information extracting component 230, and an asset inventory management component 240. As was described in accordance with FIG. 1, the asset inventory agent 130 can be coupled (e.g., wired or wirelessly) to a network, such as internal network 110 of FIG. 1, and capable of monitoring, detecting, capturing, or otherwise receiving data packets from other computing devices (e.g., enterprise IoT devices 120a-120e) on the internal network 110. It is contemplated, however, that in some embodiments, asset inventory agent 130 can be coupled to another network (not shown) that is external (e.g., cloud-based) to the internal network 110 but in communication with the internal network 110, such that the data packets from the other computing devices (e.g., enterprise IoT devices 120a-120e) can exfiltrate the internal network 110, where asset inventory agent 130 is also capable of monitoring, detecting, capturing, or otherwise receiving data packets from the other computing devices.

In some embodiments, the asset discovery component 210 can monitor the network (i.e., the network through which data packets from enterprise IoT devices are transmitted), detect or capture data packets transmitted through the network, or otherwise receive the data packets transmitted from an enterprise IoT device via the network. After the asset discovery component 210 receives a data packet from a particular enterprise IoT device (e.g., enterprise IoT device 120a), a protocol identifying component 220 of the asset inventory agent 130 can determine the communication protocol associated with the data packet. A communication protocol utilized by an enterprise IoT device can include, among other things, Zigbee, Z-Wave, Bluetooth, Wi-Fi, MQTT, CoAP, or LWM2M, by way of non-limiting example. In some aspects, an enterprise IoT device can transmit a data packet utilizing a communication protocol associated therewith. To this end, the protocol identifying component 220 can determine the communication protocol with which the data packet was transmitted.

It is contemplated that protocol identifying component 220 can determine the communication protocol of a data packet in a variety of ways. In one aspect, protocol identifying component 220 can identify a port number utilized to communicate a data packet. As different protocols utilize different port numbers, the protocol identifying component 220 may determine a corresponding communication protocol for the data packet based on the port number associated with the transmission. In another aspect, the protocol identifying component 220 can "packet sniff" the data packet utilizing a sniffing tool, such as tcpdump or Wireshark, which can analyze the data packet's headers and payloads to determine the corresponding communication protocol for the data packet. In another aspect, the protocol identifying component 220 can employ a built-in protocol decoder that can automatically identify and decode an associated communication protocol. In yet another aspect, the protocol identifying component 220 can employ a protocol analyzer that can analyze a data packet and identify therefrom detailed information about the corresponding communication protocol, packet structure of the data packet, fields of the data packet, and/or states of the data packet. Lastly, in another aspect, the protocol identifying component 220 can examine a data payload of the data packet (i.e., inspect the application layer of the data packet) to identify the corresponding communication protocol and the application utilizing it.

In some embodiments, the asset information extracting component 230 can select, based on a communication protocol identified for a data packet generated by a particular enterprise IoT device, a discovery rule set that facilitates the extraction of device or inventory information (i.e., identifying and operating information associated with the particular enterprise IoT device) from the data packet. The selected discovery rule set can be selected from a plurality of discovery rule sets, whereby each discovery rule set is associated with one of a plurality of communication protocols. In other words, each discovery rule set can include a corresponding set of business logic that facilitates the analyzing, identifying, and parsing of device or inventory information from a data packet received from an enterprise IoT device. The set of business logic that corresponds to a discovery rule set can include rules, logic, or other data extraction techniques that are defined based on particularities of the corresponding communication protocol.

In accordance with various embodiments described herein, the inventory information that can be extracted from a data packet received from an enterprise IoT device can include any portion of: a device name or other unique identifier (e.g., hostname, MAC address, serial number); device type and model (e.g., an IoT device, an IIoT device, an OT device, a computer, a server); device location (e.g., business name, building name, geographic information); device status (e.g., active, inactive, in use, available for use); network configuration (e.g., IP address, subnet address); device configuration (e.g., hardware and software configuration, memory size, storage, processing power, operating system, software inventory); device utilization (e.g., how resources are being utilized); device age; device ownership (e.g., identity of party responsible for device ownership or management); device compliance (e.g., status of compliance with regulations or standards); device contracts and warranties; or the like. It is contemplated that any piece of inventory information extracted from a data packet generated by an enterprise IoT device will include one or more attributes that can associate the data packet back to the enterprise IoT device, whether it be the device name or unique identifier, IP address, MAC address, or the like. To this end, any one or more data packets received from an enterprise IoT device can be associated with the enterprise IoT device.

In some embodiments, the asset inventory agent 130 can include an asset inventory management component 240 that can interact with one or more nodes of a plurality of nodes adapted to collectively maintain a distributed ledger. While it is contemplated that any type of distributed ledger may be employed within the purview of the present disclosure, a preferred embodiment includes the utilization of a blockchain (also referred to herein as an IT asset inventory blockchain). Among other things, the asset inventory management component 240 can perform a variety of inventory management tasks utilizing the IT asset inventory blockchain. By way of non-limiting example, the asset inventory management component 240 can query the IT asset inventory blockchain to identify one or more records relating to an enterprise IoT device, determine a current state of the enterprise IoT device, generate transactions including inventory information for storage on the IT asset inventory blockchain, and facilitate the registration, tracking, inventorying, and deprecation of the enterprise IoT device, among other things.

Figure 3:
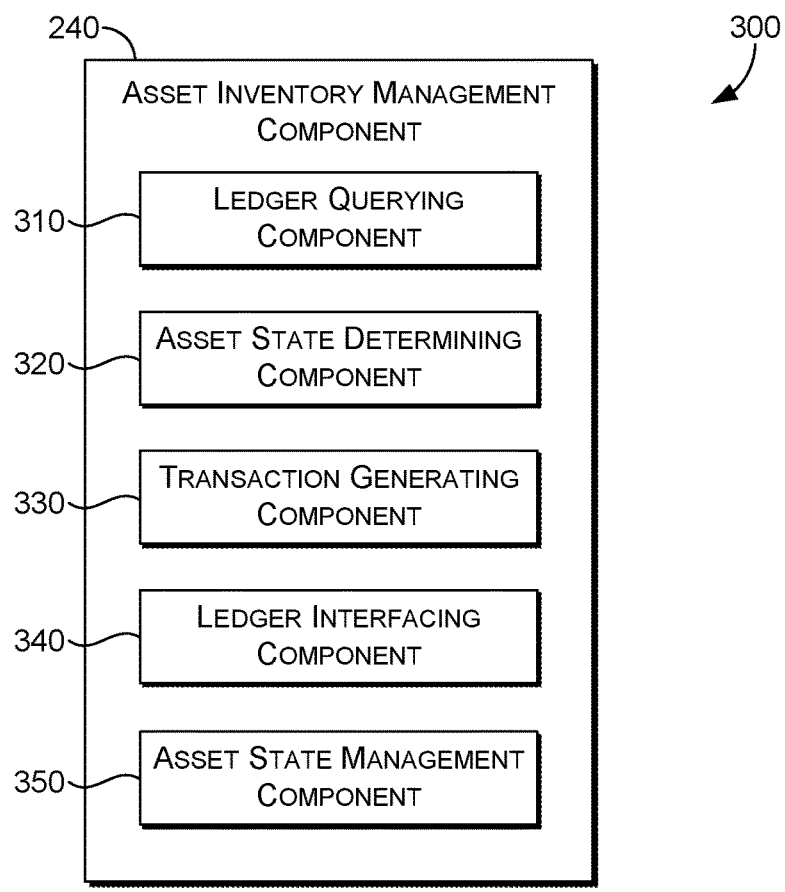
FIG. 3 is a block diagram depicting an exemplary asset inventory management component in accordance with some embodiments of the present disclosure.

Looking now to FIG. 3, a block diagram 300 is provided depicting an exemplary asset inventory management component 240, such as is depicted in FIG. 2, in accordance with some embodiments of the present disclosure. In some embodiments, the asset inventory management component 240 can include at least one computing device described in accordance with FIG. 7. The asset inventory management component 240 can further include, among other things, any one or more of a ledger querying component 310, an asset state determining component 320, a transaction generating component 330, a ledger interfacing component 340, and an asset state management component 350.

In various embodiments, the asset inventory management component 240 can include a ledger querying component 310 that can query data stored on the IT asset inventory blockchain. In some embodiments, the ledger querying component 310 can receive a copy of the IT asset inventory blockchain from one or more nodes that maintain the IT asset inventory blockchain, or from a remote computing device having a copy of the IT asset inventory blockchain, to search the IT asset inventory blockchain for one or more values or fields of interest (i.e., attributes relating to an enterprise IoT device). In some other embodiments, the ledger querying component 310 can generate a query for the one or more values or fields of interest, and send the query to the one or more nodes. In this regard, a node can process the query and return search results of records (otherwise known as transactions) on the IT asset inventory blockchain that may correspond to the values or fields of interest defined in the query. In yet another embodiment, the ledger querying component 310 can send the query to a remote computing device, such as a blockchain explorer or blockchain search engine, adapted to search the IT asset inventory blockchain and return relevant results based on the query. In any regard, the ledger querying component 310 can generate a query associated with an enterprise IoT device, typically including a unique identifier (e.g., device or host name, IP address, MAC address, serial number) of the enterprise IoT device, determine whether one or more records relevant to the query is stored on the IT asset inventory blockchain, and receive the one or more records for further action or analysis.

In various embodiments, the asset inventory management component 240 can include an asset state determining component 320 that can analyze the search results, received from the ledger querying component 310, to determine a state of the enterprise IoT device. In some aspects, because blockchains are generally immutable, the IT asset inventory blockchain may store therein a plurality of records relating to a particular unique identifier (i.e., a particular enterprise IoT device), as one of ordinary skill may appreciate. If and when inventory information (also referenced herein as "attributes") of an enterprise IoT device change over time, new transactions including such attributes may be stored on the IT asset inventory blockchain. It is thus possible that multiple transactions or records relating to an enterprise IoT device, each having a corresponding timestamp, may be stored on the IT asset inventory blockchain. As such, the asset state determining component 320 can compare timestamps of each record to select a most-recent or latest-in-time record associated with an enterprise IoT device. Utilizing the most-recent record, the asset state determining component 320 can determine a state of the enterprise IoT device based on the attributes stored in the selected record.

In some other aspects, as one of ordinary skill in the art may appreciate, certain distributed ledgers or blockchains may facilitate smart contract creation and execution. Distributed ledgers, such as Ethereum, Hyperledger Fabric, EOS, Corda, Stellar, or Rootstock, just to name a few, are various types of distributed ledger platforms that support the creation, storage and execution of smart contracts. Each smart contract can have its own storage area, called a storage or a memory, where it can read and write data. This storage can be persistent, meaning that the data stored in it can remain, even after the contract has finished executing. Smart contracts can utilize this storage to keep track of various states, such as the balance of an account, the ownership of an asset, or any other variable (e.g., the activity status or updateable/dynamic attributes of an enterprise IoT device). For example, in the case of a smart contract associated with a particular enterprise IoT device, the smart contract can keep track of when the enterprise IoT device first appeared on the network, last appeared on the network, or any other attribute about the enterprise IoT device that may change over time based on subsequent data packets received (or not received) therefrom. In this regard, an asset state determining component 320 in some embodiments can identify a record associated with an enterprise IoT device. The record may be selected as an only record or a most-recent record, for example.

In some embodiments, the asset state determining component 320 can determine that a smart contract associated with the enterprise IoT device is stored within the record. For instance, the smart contract can include or otherwise be labeled with a unique identifier associated with the enterprise IoT device. In an aspect, the record including the smart contract can be stored in the IT asset inventory blockchain as the only or most-recent record associated with the enterprise IoT device. To this end, the smart contract can store therein a set of static, immutable or non-updateable values (e.g., unique identifier, serial number, MAC address) or variables that are permanently associated with the enterprise IoT device. Additionally, the smart contract can further store therein a set of dynamic or updateable values (e.g., active status, timestamp of last heartbeat, IP address, location) or variables, any of which can be updated through one or more transactions that are programmed to update the values within the smart contract. The smart contract may include one or more dynamic values or "states" that may change over time, such as device location, device status, network configuration, device utilization, device compliance, or any other piece of inventory information that can be extracted from a data packet received from the enterprise IoT device.

In various embodiments, the asset inventory management component 240 can include a transaction generating component 330 that can generate transactions, which include inventory information or attributes of an enterprise IoT device, for transmission to one or more nodes and for subsequent storage on an IT asset inventory blockchain maintained by the one or more nodes. As described herein, the asset information extracting component 230 of FIG. 2 can extract from a data packet one or more pieces of inventory information associated with an enterprise IoT device. In some embodiments, the transaction generating component 330 can receive the extracted inventory information and generate a transaction for purposes of storing the generated transaction on an IT asset inventory blockchain. In some other embodiments, the transaction generating component 330 can receive the extracted inventory information and generate a transaction for purposes of updating one or more dynamic values or states of a smart contract associated with an enterprise IoT device on the IT asset inventory blockchain. In some aspects, the transaction generating component 330 can digitally sign (e.g., with a digital signature) a generated transaction with a private key. The private key can be associated with the asset inventory agent 130 or an entity associated with the asset inventory agent 130.

In various embodiments, the asset inventory management component 240 can include a ledger interfacing component 340 that can establish a communications session with at least one node of a plurality of nodes that collectively maintain an IT asset inventory blockchain. The ledger interfacing component 340 need only establish a session with a single node, as each node may be configured to identify peers and share with ledger interfacing component 340 the address of other nodes. In some aspects, an IP address of a known node may be defined and accessible to the ledger interfacing component 340, such that the ledger interfacing component 340 can establish a session with the node and/or receive IP addresses of additional nodes so that additional sessions can be established therewith. After ledger interfacing component 340 establishes a communications session between the asset inventory management component 240 and a node of the plurality of nodes, any transactions generated via transaction generating component 330 can be transmitted to the node via the communications session. Likewise, any acknowledgements or return communications generated by the node can be transmitted back to the asset inventory management component 240 via the communications session.

In various embodiments, the asset inventory management component 240 can include an asset state management component 350. The asset state management component 350 can include any number of operations for dynamically managing or otherwise tracking and updating the state of an enterprise IoT device in accordance with embodiments described herein. In some aspects, the operations may include processes for deprecating an enterprise IoT device. As will be described, the operations performed by asset state management component 350 can employ any combination of components described herein, including at least those described in relation to asset inventory agent 130 or asset inventory management component 240.

In some embodiments, the asset state management component 350 can create one or more IT asset inventory blockchain records for an enterprise IoT device. More specifically, in some embodiments, the asset state management component 350 can first determine whether a record associated with an enterprise IoT device exists or is otherwise stored on an IT asset inventory blockchain. In other words, the asset state management component 350 can determine if the enterprise IoT device is registered. The asset state management component 350 can receive any portion of inventory information about the enterprise IoT device, preferably a unique identifier, from asset information extracting component 230 of FIG. 2. The asset state management component 350 can subsequently utilize the ledger querying component 310 to determine whether one or more records associated with the enterprise IoT device is stored on the IT asset inventory blockchain.

In some aspects, the asset state management component 350 can receive a search result including one or more existing records associated with the enterprise IoT device. The asset state management component 350 can further compare the records to determine whether any portion of the inventory information received from the asset information extracting component 230 corresponds to the inventory information stored in the one or more existing records. In some further aspects, if a determination is made that any portion of the inventory information received from the asset information extracting component 230 is different than the inventory information stored in the one or more existing records, the asset state management component 350 can employ transaction generating component 330 to generate a new record including any portion of the inventory information received from the asset information extracting component 230. As described herein, each new record may include a timestamp that corresponds to a time and date at which the record was created. In the event a determination is made that no record associated with the enterprise IoT device exists on the IT asset inventory blockchain, the asset state management component 350 can also employ transaction generating component 330 to generate a new record including any portion of the inventory information received from the asset information extracting component 230.

In some other aspects, the asset state management component 350 can receive a search result including an existing record having stored therein a smart contract associated with the enterprise IoT device. The asset state management component 350 can further compare the record to determine whether any portion of the inventory information received from the asset information extracting component 230 corresponds to the inventory information stored in the existing record or smart contract. In some further aspects, if a determination is made that any portion of the inventory information received from the asset information extracting component 230 is different than the inventory information stored in the one or more existing records or smart contracts, the asset state management component 350 can employ transaction generating component 330 to update one or more updateable values or attributes stored therein, utilizing any corresponding piece of inventory information received from the asset information extracting component 230. By way of example, the asset state management component 350 may receive a search result indicating that a record associated with an enterprise IoT device exists. However, the asset state management component 350 may also determine that an IP address of the enterprise IoT device has changed. To this end, the asset state management component 350 can employ transaction generating component 330 to update at least the IP address stored within the smart contract, so that the most current information associated with the enterprise IoT device is stored in the IT asset inventory blockchain.

It is contemplated that the asset state management component 350 can update the IT asset inventory blockchain dynamically or periodically, depending on implementation. In some embodiments, the asset state management component 350 can perform operations to update the IT asset inventory blockchain in response to every one or greater interval of data packets (e.g., after every 10, 100, 1000 data packets) received from an enterprise IoT device. In some embodiments, the asset state management component 350 can periodically (e.g., every 15 minutes, every 60 minutes, every 24 hours) monitor or otherwise listen for data packets from enterprise IoT devices. That is, every time a defined interval of time passes, the asset state management component 350 can begin listening to network traffic for a predefined period of time (e.g., 15, 30, 60 minutes), to collect inventory information or otherwise determine whether an enterprise IoT device is active.

In some embodiments, the asset state management component 350 can actively ping or otherwise query an enterprise IoT device, to determine whether the enterprise IoT device is on the network or otherwise active. As the asset state management component 350 would need to be aware of the enterprise IoT device's existence in order to ping or query an enterprise IoT device, it is contemplated that the enterprise IoT device has previously been detected (or "registered") and that a record associated therewith is already stored on the IT asset inventory blockchain.

In some aspects, the asset state management component 350 may query the enterprise IoT device if a most-recent record or smart contract associated with the enterprise IoT device indicates that a last detected heartbeat or activity state of the enterprise IoT device exceeds a threshold amount of time (e.g., 24 hours, 1 week, 1 month). In various embodiments, if the asset state management component 350 determines that an enterprise IoT device has been inactive beyond a threshold amount of time relative to a last detected heartbeat or activity state, the asset state management component 350 can determine that the device is deprecated and record a deprecated state of thereof on the IT asset inventory blockchain. That is, in an embodiment, the asset state management component 350 can employ transaction generating component 330 to generate a new record associated with the enterprise IoT device, including at least its unique identifier(s) and an indication that the enterprise IoT device is deprecated or inactive.

In yet another embodiment, the asset state management component 350 can employ transaction generating component 330 to generate a new transaction to update a smart contract associated with the enterprise IoT device, the transaction including at least the unique identifier(s) of the enterprise IoT device and an indication that the enterprise IoT device state should be changed to deprecated or inactive.

In various embodiments, as the asset inventory agent 130 of FIG. 2 can be connected to a network associated with a specific location of enterprise IoT devices, or a specific subnet or segment of enterprise IoT devices, it is contemplated that an organization may have multiple asset inventory agents 130 (e.g., throughout various locations or subnets). It is thus also contemplated that each asset inventory agent 130 can communicate with the one or more nodes that collectively maintain the IT asset inventory blockchain, which serves as a single, distributed storage medium for storing records associated with all enterprise IoT devices across the entire organization, regardless of location relative to other enterprise IoT devices. As such, the IT asset inventory blockchain can provide a single reliable data source that is accessible to all networks across the organization.

Figure 4:
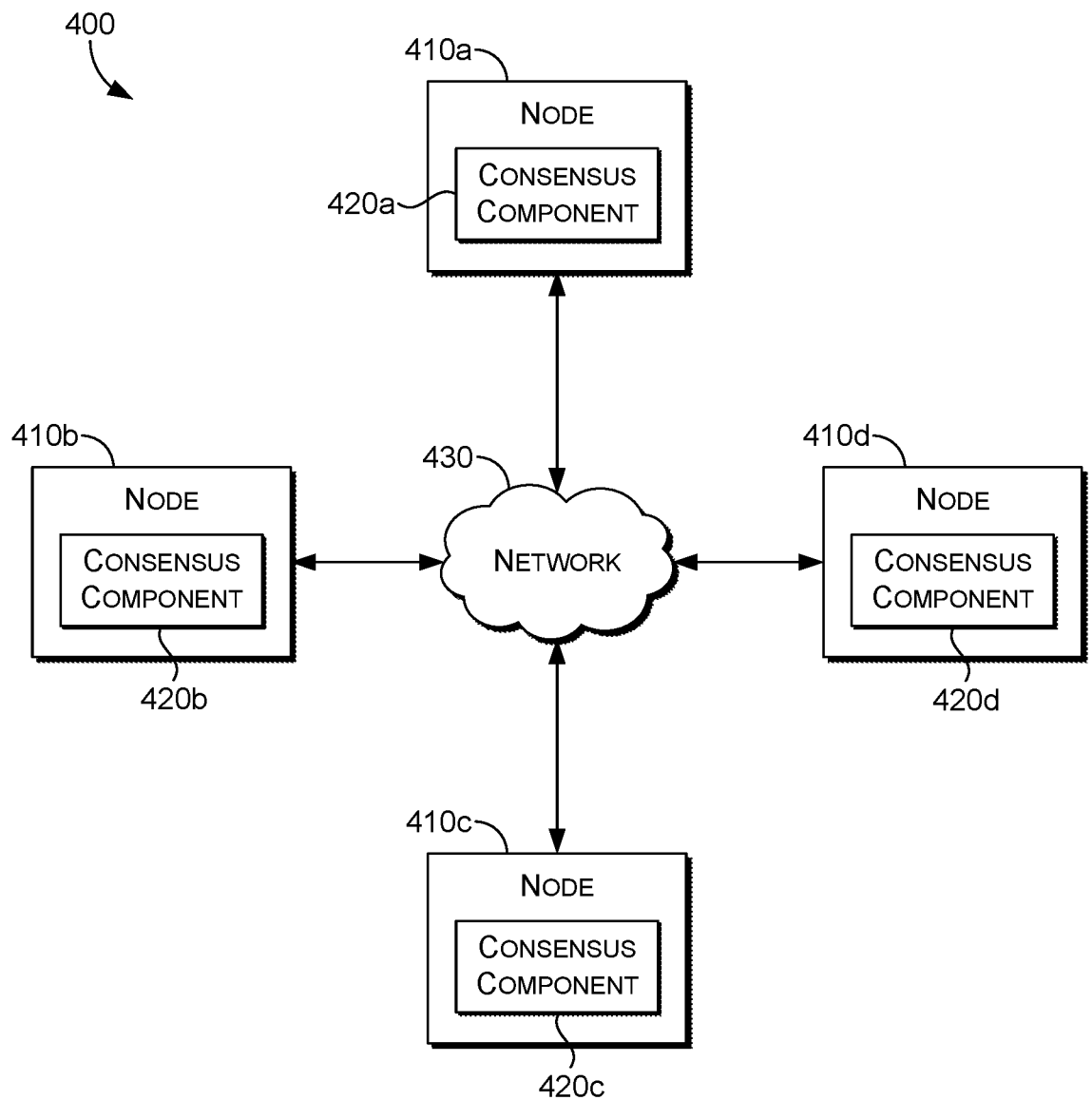
FIG. 4 is a block diagram depicting an exemplary set of nodes that collectively maintain an IT asset inventory blockchain in accordance with some embodiments of the present disclosure.

Looking now to FIG. 4, a schematic depiction is provided illustrating an exemplary set of nodes 400 that collectively maintain an IT asset inventory blockchain (also referenced herein as "the blockchain") in accordance with embodiments described herein. The set of nodes can include one or more nodes, such as nodes 410a, 410b, 410c, 410d, any of which embodiments of the present disclosure may employ. Any of such nodes can include a computing device described in accordance with FIG. 7, and are each in communication with one or more of the nodes 410a-410d via a network 430, such as the Internet. In some embodiments, and preferably for public blockchain (e.g., Ethereum) implementations, each node 410a, 410b, 410c, 410d in the distributed ledger network 400 can generally operate as a peer to every other node for purposes of maintaining a distributed ledger, such as the IT asset inventory blockchain, such that no single node is more influential or powerful than any other node 410a, 410b, 410c, 410d for purposes of maintaining the IT asset inventory blockchain. Operations performed by nodes can include, among other things, sending and receiving transactions (e.g., records, smart contracts), validating transactions, verifying blocks of transactions, and adding transactions to an immutable ledger (i.e., IT asset inventory blockchain) that is collectively maintained by the nodes 410*a*, 410*b*, 410*c*, 410*d*) a copy of which is respectively stored in a memory of each node.

It is contemplated, however, that a particular subset of the nodes can, in some implementations, be specifically designated for performing more operations than those that will be described in accordance with consensus component 420*a*-420*d*. In this regard, as opposed to embodiments where each node is an absolute peer with other nodes, some embodiments can employ specially-"privileged nodes" or "unprivileged nodes" (preferably for private blockchains or ecosystems where centralization is not a concern) that perform more operations than those generally described in accordance with FIG. 4.

In some embodiments, the distributed ledger collectively maintained by the nodes 410*a*, 410*b*, 410*c*, 410*d* is referenced herein as the IT asset inventory blockchain. The IT asset inventory blockchain maintained by the nodes 410*a*, 410*b*, 410*c*, 410*d* stores thereon a plurality of records or transactions, such as those generated by transaction generating component 330 of FIG. 3, which are immutable by virtue of characteristics of a distributed ledger, applied cryptography concepts, and the consensus component 420*a*-420*d* that is independently included in each of nodes 410*a*, 410*b*, 410*c*, 410*d*. In a traditional distributed ledger network, any node can generate a transaction to be added to a distributed ledger. In accordance with some embodiments described herein, a first node (e.g., node 410*a*) generates a transaction to be added to the IT asset inventory blockchain. As such, each node 410*a*, 410*b*, 410*c*, 410*d* can include a consensus component 420*a*, 420*b*, 420*c*, 420*d* that enforces a processor enforced rule, whereby a transaction can only be added to the IT asset inventory blockchain based on a determination that a consensus (e.g., a majority, a super majority, unanimity) of the nodes 410*a*, 410*b*, 410*c*, 410*d* has collectively validated the transaction. In this regard, while each node 410*a*, 410*b*, 410*c*, 410*d* can independently store a copy of the IT asset inventory blockchain, a transaction can only be added to the IT asset inventory blockchain when a consensus to add the transaction has been determined reached by the nodes 410*a*, 410*b*, 410*c*, 410*d* of the set of nodes 400.

In some embodiments, validation of a transaction is facilitated utilizing features of asymmetric key cryptography (i.e., public-private key pairs), among other things. In some aspects, as is commonly known in public blockchains (e.g., Bitcoin, Ethereum), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key.

In various embodiments, a transaction generated by a single node, such as node 410*a*, can be communicated from the node 410*a* to one or more other nodes 410*b*-410*c* of the set of nodes 400. In some embodiments, a transaction received by a second node, such as node 410*b* of FIG. 4, can be passed on to a third node, such as node 410*c* of FIG. 4. Similarly, node 410*c* can pass on the received transaction to yet another node, such as node 410*d* of FIG. 4. In this regard, a transaction communicated from one node to another node of the distributed ledger network 400 can be passed on to other nodes until the transaction has propagated throughout the entire set of nodes 400. In some embodiments, however, a transaction is not finalized (i.e., added to the IT asset inventory blockchain) until the transaction is validated by a consensus of nodes 410*a*, 410*b*, 410*c*, 410*d* in the set of nodes 400 maintaining the IT asset inventory blockchain.

In some embodiments, any one of nodes 410*a*, 410*b*, 410*c*, 410*d* can validate a received transaction based on a determination that the transaction has been digitally signed by a known or authorized private key, such as any node associated with the set of nodes 400, or one associated with an authorized user account. In some aspects, each node of the set of nodes 400 can determine that a transaction was digitally signed with a private key associated with a first node (e.g., node 410*a*) based on a provided or identified public key of the first node. In some implementations, a public key of the first node can be defined in each consensus component 420*a*, 420*b*, 420*c*, 420*d*, or can be defined on the IT asset inventory blockchain to be easily determined by any node of the set of nodes 400. In some other aspects, each node of the set of nodes 400 can determine that a transaction was digitally signed with a private key associated with an authorized user account based on the public key of each user account being securely shared (e.g., communicated) between the nodes 410*a*, 410*b*, 410*c*, 410*d* of the set of nodes 400.

If a node, such as one of nodes 410*a*, 410*b*, 410*c*, 410*d*, in the set of nodes 400 determines that a transaction is not valid (i.e., is not an authorized transaction), the transaction can be determined invalid by the node and the transaction is not passed on (e.g., communicated) to other nodes to which it is connected. On the other hand, if a node, such as one of nodes 410*a*, 410*b*, 410*c*, 410*d*, in the set of nodes 400, determines that a transaction is valid (i.e., is signed with an authorized key), the node passes on (e.g., communicates) the transaction, along with an indication that the node independently validated the transaction, to any other node to which it is connected. As the nodes 410*a*, 410*b*, 410*c*, 410*d*, in the set of nodes 400, are all directly or indirectly connected to one another, this validation process continues until the nodes collectively determine that a consensus has validated the transaction. The collective determination of consensus can be facilitated by virtue of each node maintaining a list of other nodes on the network (e.g., by I.P. address or other identifier) along with their respective determinations of transaction validity.

In some embodiments, after a consensus of validity for a transaction has been reached by the nodes (e.g., nodes 410*a*, 410*b*, 410*c*, 410*d*), the transaction can be added to the IT asset inventory blockchain. In some embodiments, a validated transaction must await confirmation before it is added to the IT asset inventory blockchain. As the nodes 410*a*, 410*b*, 410*c*, 410*d* can be peers with one another, any node can participate in the process of adding the transaction to the IT asset inventory blockchain. For purposes of background, the IT asset inventory blockchain includes validated transactions that are grouped into a cryptographically chained series of blocks, whereby each block includes a subset of these transactions. In some embodiments, any node of the set of nodes 400 can perform the process of block generation, which can be implemented in a variety of ways based on a consensus algorithm executed by the consensus component (e.g., consensus component 420*a*, 420*b*, 420*c*, 420*d*) including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the IT asset inventory blockchain, the transaction must first be included into a block that is being generated by one of the nodes 410a-410d and subsequently validated by a consensus of the nodes in the set of nodes 400. The transaction can be independently included into a block, or grouped together with other transactions, either of which are included within the purview of the present disclosure. Such implementations may vary, however, based on design considerations of the consensus component 420a-420d and/or a block size (i.e., memory limitation) implemented or defined within in the consensus component 420a-420d of the nodes 410a-410d. In various embodiments, a node generating a block must also include, into the block it is generating, a cryptographic hash of the block most-recently added to the IT asset inventory blockchain. Once generated in accordance with any consensus rules defined by the consensus component (e.g., consensus components 420a-420d), a node generating a block can send the generated block to any of the nodes to which it is connected.

In some embodiments, nodes receiving the generated block can verify that the block includes one or more valid transactions, includes a hash value of a block most-recently added to the IT asset inventory blockchain, and was generated in accordance with the defined consensus rules. Upon verifying the foregoing, each node in the set of nodes 400 can pass on (e.g., communicate) the verified block to its neighboring node(s). In this way, and similar to how a transaction is validated by a determined consensus of the set of nodes 400, a generated block including at least the transaction can be verified by another determined consensus of the nodes. When a determination is made that a consensus of the nodes 410a-410d has verified a block, the newly-verified block is added by each of the nodes 410a-410d to its respective copy of the IT asset inventory blockchain immediately subsequent to the previously-added block, the hash of the previously-added block being included in the newly-verified block. In this regard, each block can be cryptographically "chained" to a previous block and a subsequent block. In other words, the cryptographic hashes can immutably enforce the order and accuracy of transactions stored on the IT asset inventory blockchain. In some embodiments, each respective copy of the IT asset inventory blockchain maintained by a node can be accessed by the node or any other node in the set of nodes 400. In this regard, the IT asset inventory blockchain can be provided as a transparent record of transactions, that can be cross-referenced in a variety of manners, whether for purposes of auditing, verifying, or simply referencing transactions that have been performed on or in association with enterprise IoT devices.

Figure 5:
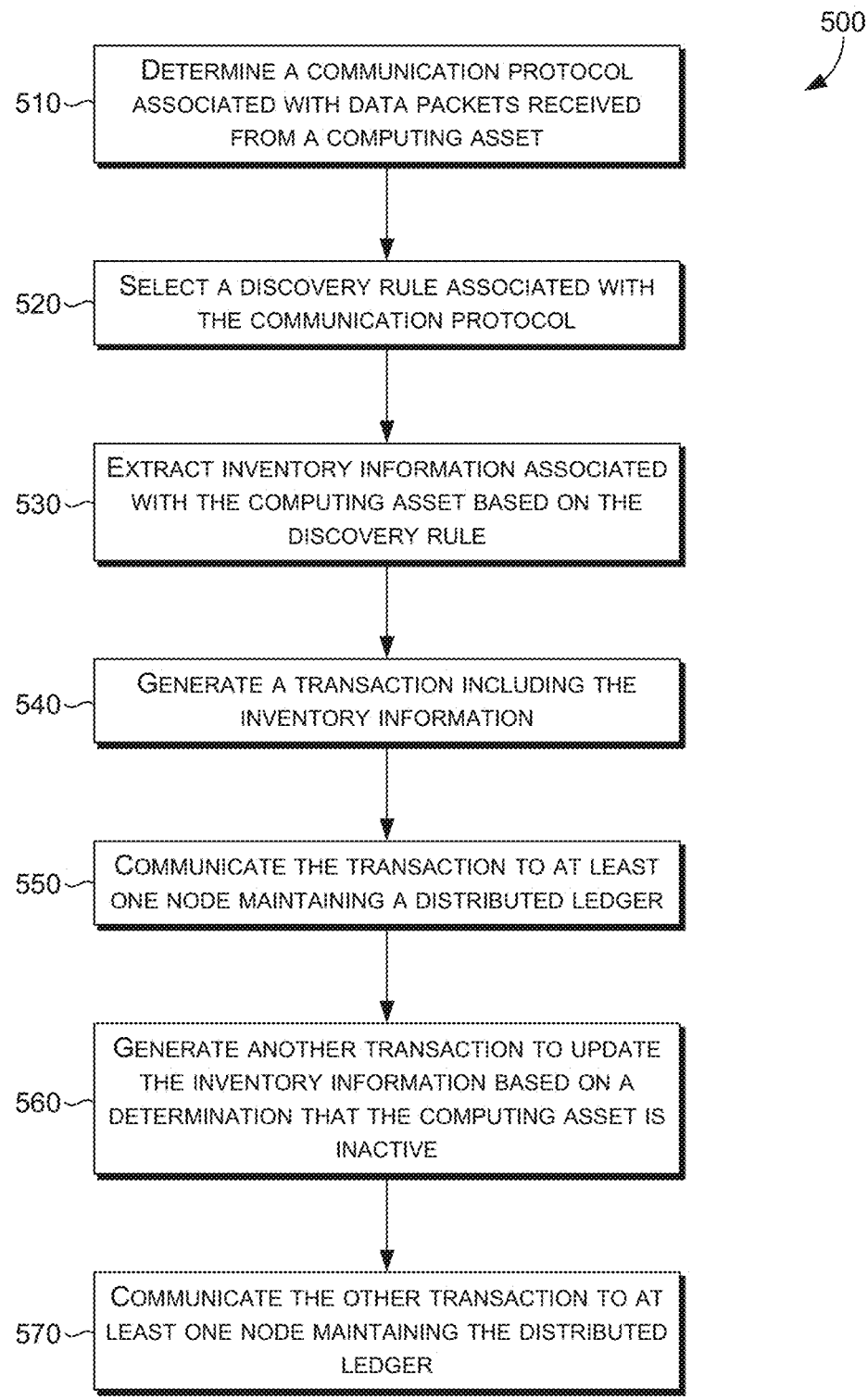
FIG. 5 is a flow diagram showing a method for inventorying IT asset information in accordance with some embodiments of the present disclosure.

Turning now to FIG. 5, a flow diagram 500 is provided that illustrates a method for dynamically registering and inventorying an enterprise IoT device in accordance with some embodiments of the present disclosure. As described in accordance with FIG. 2, an asset inventory agent, such as asset inventory agent 130, can monitor, detect, intercept, listen to, or otherwise receive a data packet from an enterprise IoT device that is on a network with the asset inventory agent 130. At block 510, the asset inventory agent can employ a protocol identifying component, such as protocol identifying component 220 of FIG. 2, to determine a communication protocol associated with the data packet generated by and received from the enterprise IoT device. The communication protocol associated with the data packet can include any one of a plurality of communication protocols, such as Zigbee, Z-Wave, Bluetooth, Wi-Fi, MQTT, CoAP, or LWM2M, by way of non-limiting example.

The protocol identifying component can determine the corresponding communication protocol in a variety of ways. In one example, the protocol identifying component can detect a port number through which the data packet was received to determine the corresponding communication protocol. In another example, the protocol identifying component can "packet sniff" the data packet and analyze the data packet's headers and payloads to determine the corresponding communication protocol. The protocol identifying component can alternatively employ a protocol decoder that can identify and decode the corresponding communication protocol. In yet another example, the protocol identifying component can employ a protocol analyzer to determine detailed information about the corresponding communication protocol, packet structure of the data packet, fields of the data packet, and/or states of the data packet. Lastly, the protocol identifying component can inspect the application layer of the data packet to identify the corresponding communication protocol.

At block 520, the asset inventory agent can employ an asset information extracting component, such as asset information extracting component 230 of FIG. 2, to select a discovery rule set from a plurality of discovery rule sets in order to appropriately extract inventory information (i.e., attributes or inventory information) from the data packet. As each discovery rule set in the plurality of discovery rule sets is associated with one of a plurality of communication protocols, the selection of the correct discovery rule set is necessary to properly extract the inventory information from the data packet. Each discovery rule set can be defined based on a variety of factors, including data packet structure, header information, length, control fields, control flags, or other payload information included in the data packet. As various communication protocol packet structures are generally distinguishable, the corresponding discovery rule sets can be defined based on the known characteristics of the data packets (i.e., messages) received through the protocols.

At block 530, the asset information extracting component can employ the selected discovery rule set to extract the inventory information associated with the enterprise IoT device from the data packet. As described herein, the extracted information can include one or more of a device name or other unique identifier (e.g., hostname, MAC address, serial number), device type and model, device location, device status, network configuration, device configuration, device utilization, device age, device ownership, device compliance, or device contracts and warranties, just to name a few.

At block 540, the extracted inventory information can be communicated to an asset inventory management component, such as asset inventory management component 240 of FIGS. 2 and 3. The asset inventory management component can, among other things, perform operations to determine whether the extracted inventory information should be stored onto a distributed ledger, such as an IT asset inventory blockchain described in accordance with embodiments of the present disclosure. The asset inventory management component can employ a ledger querying component, such as ledger querying component 310 of FIG. 3, to search the IT asset inventory blockchain for any records associated with the enterprise IoT device. If one or more records associated with the enterprise IoT device is already stored on the IT asset inventory blockchain, an asset state determining component, such as asset state determining component 320 of FIG. 3, can determine that the enterprise IoT device has previously been registered. Alternatively, if no records exist, the asset state determining component can determine that the enterprise IoT device has not been registered.

In some aspects, if the asset state determining component determines that the enterprise IoT device has not been registered, the extracted inventory information can be passed onto a transaction generating component, such as transaction generating component 330 of FIG. 3, to generate a new transaction including the extracted inventory information for storage as a new record onto the IT asset inventory blockchain. As described herein, the asset inventory management component can employ a ledger interfacing component, such as ledger interfacing component 340 of FIG. 3, to establish a session with one or more nodes (e.g., set of nodes 400 of FIG. 4) maintaining the IT asset inventory blockchain.

If one or more records do exist, however, the asset state determining component can determine that the enterprise IoT device has been registered. The asset state determining component can then identify a most-recent record of the one or more records and determine whether one or more attributes or pieces of inventory information relative to the extracted inventory information has changed. If the asset state determining component determines that no information has changed, then no action may be taken. However, if a determination is made that inventory information has changed, then the transaction generating component can be employed to generate a new transaction including the extracted inventory information for storage as a new record onto the IT asset inventory blockchain. Similarly, the asset inventory management component can employ the ledger interfacing component to establish a session with the one or more nodes maintaining the IT asset inventory blockchain. At block 550, the asset inventory management component can transmit the generated transaction to the one or more nodes via the established session(s) so that the transaction can be stored as a new record onto the IT asset inventory blockchain.

In some aspects, if the asset state determining component determines that the enterprise IoT device has been inactive beyond a threshold amount of time relative to a last detected heartbeat or activity state, the asset state determining component can determine that the device is deprecated and record a deprecated state of thereof on the IT asset inventory blockchain. That is, the transaction generating component can be employed to generate, at block 560, a new record associated with the enterprise IoT device, including at least its unique identifier(s) and an indication that the enterprise IoT device is deprecated or inactive. At block 570, the asset inventory management component can transmit the generated transaction to the one or more nodes via the established session(s) so that the transaction can be stored as a new record onto the IT asset inventory blockchain.

Figure 6:
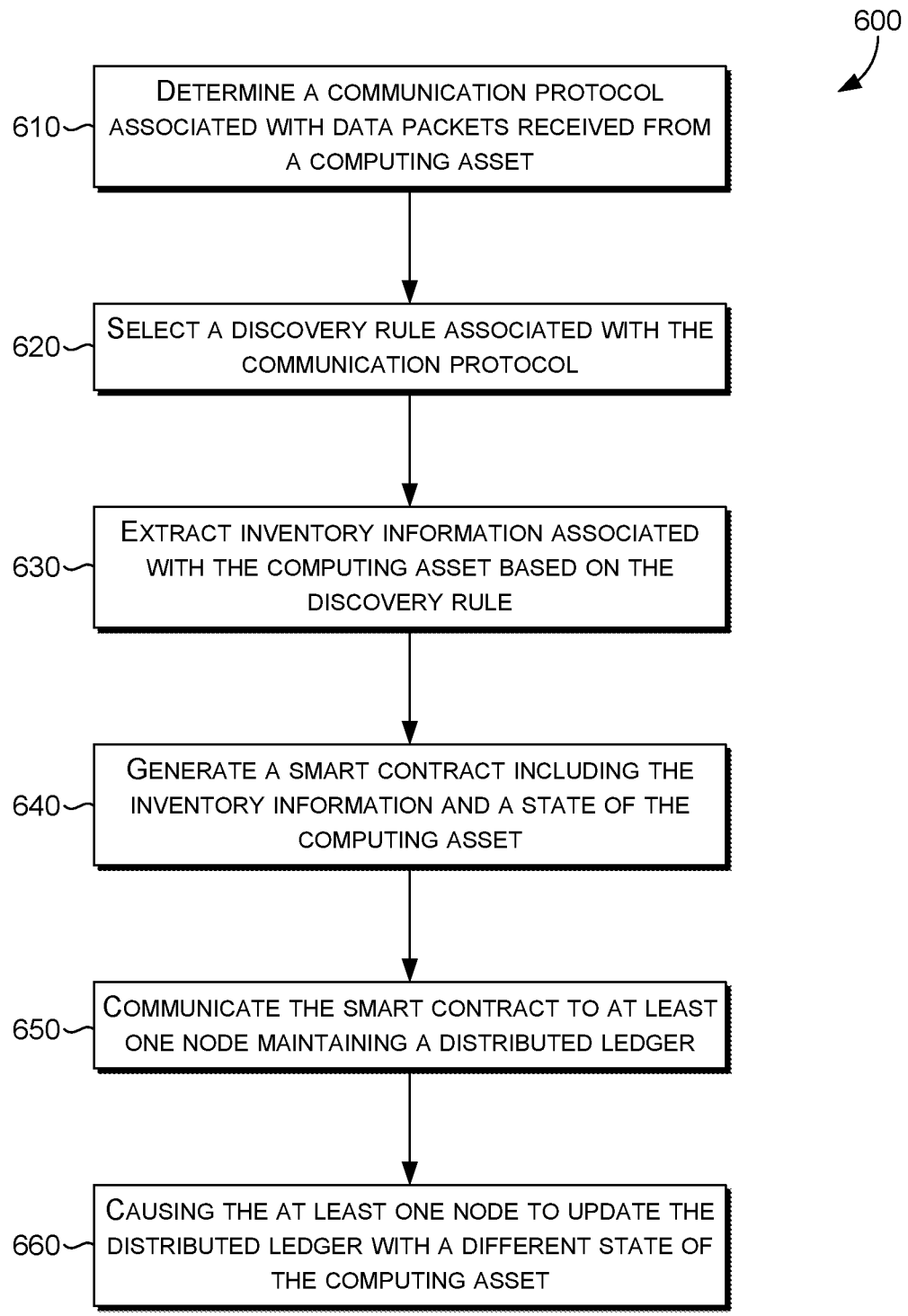
FIG. 6 is a flow diagram showing another method for inventorying IT asset information in accordance with some embodiments of the present disclosure.

Turning now to FIG. 6, a flow diagram 600 is provided that illustrates another method for dynamically registering and inventorying an enterprise IoT device in accordance with some embodiments of the present disclosure. As was described in accordance with FIG. 2, an asset inventory agent, such as asset inventory agent 130, can monitor, detect, intercept, listen to, or otherwise receive a data packet from an enterprise IoT device that is on a network with the asset inventory agent 130. At block 610, the asset inventory agent can employ a protocol identifying component, such as protocol identifying component 220 of FIG. 2, to determine a communication protocol associated with the data packet generated by and received from the enterprise IoT device. The communication protocol associated with the data packet can include any one of a plurality of communication protocols, such as Zigbee, Z-Wave, Bluetooth, Wi-Fi, MQTT, CoAP, or LWM2M, by way of non-limiting example.

The protocol identifying component can determine the corresponding communication protocol in a variety of ways. For instance, the protocol identifying component can detect a port number through which the data packet was received to determine the corresponding communication protocol. In another example, the protocol identifying component can "packet sniff" the data packet and analyze the data packet's headers and payloads to determine the corresponding communication protocol. The protocol identifying component can alternatively employ a protocol decoder that can identify and decode the corresponding communication protocol. In yet another example, the protocol identifying component can employ a protocol analyzer to determine detailed information about the corresponding communication protocol, packet structure of the data packet, fields of the data packet, and/or states of the data packet. Lastly, the protocol identifying component can inspect the application layer of the data packet to identify the corresponding communication protocol.

At block 620, the asset inventory agent can employ an asset information extracting component, such as asset information extracting component 230 of FIG. 2, to select a discovery rule set from a plurality of discovery rule sets in order to appropriately extract inventory information (i.e., attributes or inventory information) from the data packet. As each discovery rule set in the plurality of discovery rule sets is associated with one of a plurality of communication protocols, the selection of the correct discovery rule set is necessary to properly extract the inventory information from the data packet. Each discovery rule set can be defined based on a variety of factors, including data packet structure, header information, length, control fields, control flags, or other payload information included in the data packet. As various communication protocol packet structures are generally distinguishable, the corresponding discovery rule sets can be defined based on the known characteristics of the data packets (i.e., messages) received through the protocols.

At block 630, the asset information extracting component can employ the selected discovery rule set to extract the inventory information associated with the enterprise IoT device from the data packet. As described herein, the extracted information can include one or more of a device name or other unique identifier (e.g., hostname, MAC address, serial number), device type and model, device location, device status, network configuration, device configuration, device utilization, device age, device ownership, device compliance, or device contracts and warranties, just to name a few.

The extracted inventory information can be communicated to an asset inventory management component, such as asset inventory management component 240 of FIGS. 2 and 3. The asset inventory management component can, among other things, perform operations to determine whether the extracted inventory information should be stored onto a distributed ledger, such as an IT asset inventory blockchain described in accordance with embodiments of the present disclosure. The asset inventory management component can employ a ledger querying component, such as ledger querying component 310 of FIG. 3, to search the IT asset inventory blockchain for any smart contracts, or records including smart contracts, either of which are associated with the enterprise IoT device. If a smart contract associated with the enterprise IoT device is already stored on the IT asset inventory blockchain, an asset state determining component, such as asset state determining component 320 of FIG. 3, can determine that the enterprise IoT device has previously been registered. Alternatively, if no smart contract associated with the enterprise IoT device exists, the asset state determining component can determine that the enterprise IoT device has not been registered.

In some aspects, if the asset state determining component determines that the enterprise IoT device has not been registered, the extracted inventory information can be passed onto a transaction generating component, such as transaction generating component 330 of FIG. 3, to generate a new transaction including a smart contract associated with the enterprise IoT device. The smart contract can be generated including any portion of the extracted inventory information for storage as a new record onto the IT asset inventory blockchain. As is described herein, the smart contract can include one or more non-updateable fields (e.g., unique identifier(s)) or updateable fields (e.g., activity status, health, IP address, location). The asset inventory management component can then employ a ledger interfacing component, such as ledger interfacing component 340 of FIG. 3, to establish a session with one or more nodes (e.g., set of nodes 400 of FIG. 4) maintaining the IT asset inventory blockchain.

If a smart contract associated with the enterprise IoT device does exist on the IT asset inventory blockchain, however, the asset state determining component can determine that the enterprise IoT device has been registered. The asset state determining component can then determine whether one or more attributes or pieces of updateable inventory information relative to the extracted inventory information has changed. If the asset state determining component determines that no updateable information has changed, then no action may be taken. However, if a determination is made that updateable inventory information has changed, then the transaction generating component can be employed to generate a new transaction including the updated inventory information for updating the smart contract associated with the enterprise IoT device on the IT asset inventory blockchain. Similarly, the asset inventory management component can employ the ledger interfacing component to establish a session with the one or more nodes maintaining the IT asset inventory blockchain. At block 650, the asset inventory management component can transmit the generated transaction to the one or more nodes via the established session(s) so that the smart contract associated with the enterprise IoT device can be updated.

Figure 7:
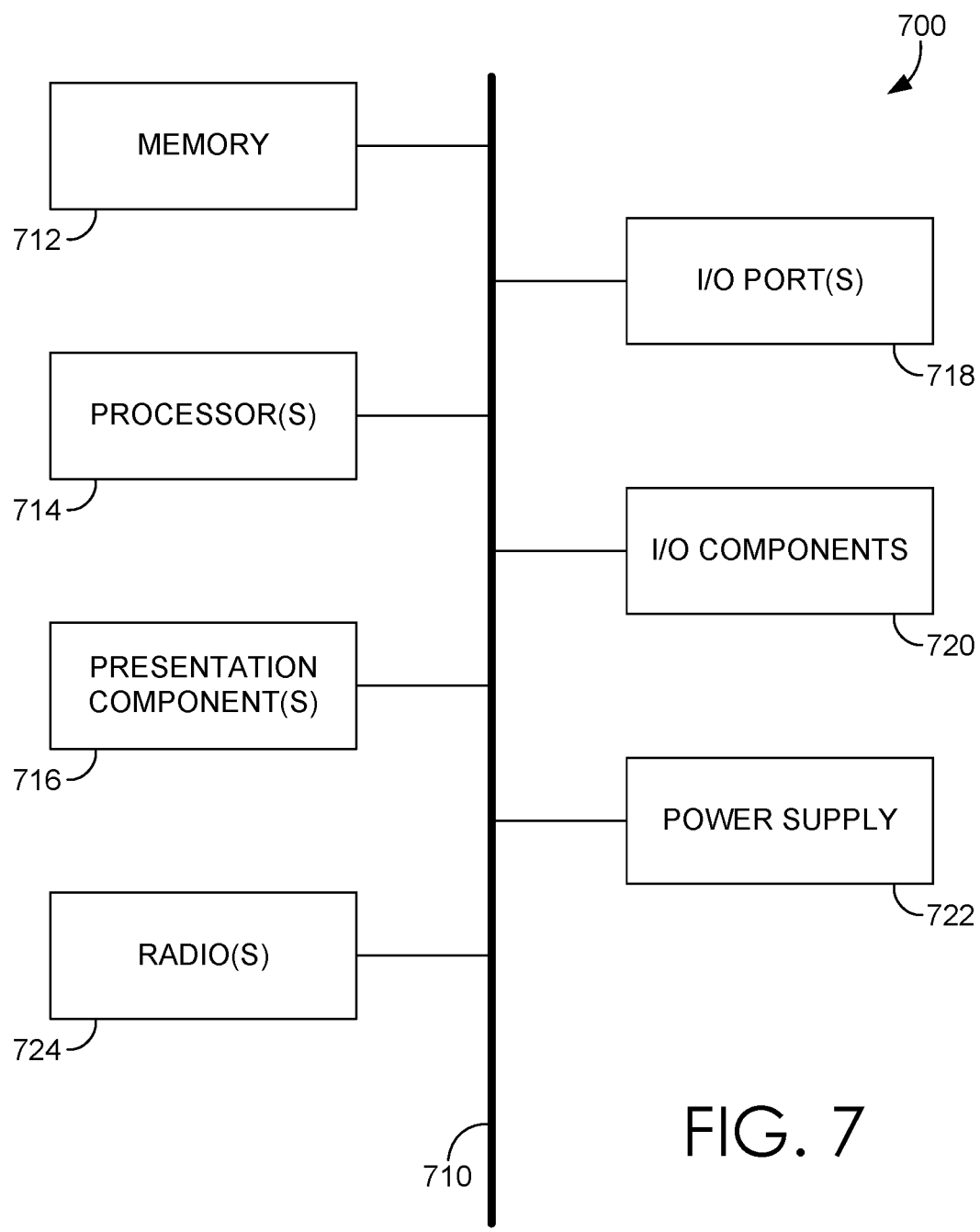
FIG. 7 is a block diagram of an exemplary computing environment suitable for use in implementing some embodiments of the present disclosure.

Having described embodiments of the present disclosure, an exemplary operating environment in which embodiments of the present disclosure may be implemented is described below in order to provide a general context for various aspects of the present disclosure. Referring initially to FIG. 7 in particular, an exemplary operating environment for implementing embodiments of the present disclosure is shown and designated generally as computing device 700. Computing device 700 is but one example of a suitable computing environment and is not intended to suggest any limitation as to the scope of use or functionality of the described embodiments. Neither should the computing device 700 be interpreted as having any dependency or requirement relating to any one or combination of components illustrated.

The various embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The various embodiments may be practiced in a variety of system configurations, including hand-held devices, consumer electronics, general-purpose computers, more specialty computing devices, etc. The various embodiments may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present disclosure provide for, among other things, facilitating the self-registering and updating of IT asset inventory information on a distributed ledger. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that the described embodiments are one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter described in the present disclosure is provided with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   determining a communication protocol associated with a data packet received from a computing asset on a network;
   selecting, from a plurality of discovery rule sets, a discovery rule set associated with the communication protocol;
   extracting, from the data packet, inventory information associated with the computing asset based on the selected discovery rule set;
   generating a digitally-signed transaction having a smart contract associated with the computing asset for storage on a distributed ledger, the digitally-signed transaction being generated based on the extracted inventory information and based further on a determination that the smart contract does not exist on the distributed ledger, wherein the smart contract includes a dynamic state variable that assigns an updateable status of the computing asset as active and a timestamp based on the received data packet;
   after the digitally-signed transaction is generated, causing a plurality of nodes to validate the digitally-signed transaction and store the smart contract associated with the computing asset onto the distributed ledger;
   generating another digitally-signed transaction to update the updateable status of the dynamic state variable of the smart contract as inactive based on a determination that a threshold amount of time has exceeded the timestamp; and
   causing the plurality of nodes to validate the other digitally-signed transaction and change the updateable status as inactive.

2. The method of claim 1, wherein the communication protocol is determined based at least in part on header information included in the data packet.

3. The method of claim 1, wherein each discovery rule set in the plurality of discovery rule sets is defined based on characteristics of a corresponding communication protocol.

4. The method of claim 1, the smart contract including at least one updateable field.

5. The method of claim 4, the smart contract further including at least one non-updateable field.

6. The method of claim 1, further comprising:
   extracting, from another data packet, additional inventory information associated with the computing asset based on the selected discovery rule set;
   generating a digitally-signed updating transaction for the smart contract based on a determination that the extracted additional inventory information is different than the inventory information stored in the smart contract; and
   after the digitally-signed updating transaction is generated, causing the plurality of nodes to update the smart contract based on the digitally-signed updating transaction.

7. The method of claim 1, wherein the determination that the smart contract does not exist on the distributed ledger is made by searching the distributed ledger for a unique identifier associated with the computing asset.

8. A non-transitory computer storage medium storing computer-useable instructions that, when used by one or more computing devices, cause the one or more computing devices to perform operations comprising:

determining a communication protocol associated with a data packet received from a computing asset on a network;

selecting, from a plurality of discovery rule sets, a discovery rule set associated with the communication protocol;

extracting, from the data packet, inventory information associated with the computing asset based on the selected discovery rule set;

generating a digitally-signed transaction having a smart contract associated with the computing asset for storage on a distributed ledger, the digitally-signed transaction being generated based at least in part on a search for the computing asset in the distributed ledger and based further on a determination that the smart contract associated with the computing asset does not exist on the distributed ledger, wherein the smart contract includes a dynamic state variable that assigns an updateable status of the computing asset as active and a timestamp based on the received data packet and wherein the distributed ledger is maintained by a plurality of nodes;

after the digitally-signed transaction is generated, communicating the digitally-signed transaction to at least one node of the plurality of nodes for storing the smart contract on the distributed ledger;

generating another digitally-signed transaction to update the updateable status in the dynamic state variable of the smart contract as inactive based on a determination that a threshold amount of time has exceeded the timestamp; and causing the plurality of nodes to validate the other digitally-signed transaction and change the updateable status as inactive.

9. The medium of claim 8, wherein the search is performed utilizing a block explorer of the distributed ledger.

10. The medium of claim 8, wherein the communication protocol is determined based at least in part on header information included in the data packet.

11. The medium of claim 8, wherein each discovery rule set in the plurality of discovery rule sets is defined based on characteristics of a corresponding communication protocol.

12. The medium of claim 8, the smart contract including at least one updateable field and at least one non-updateable field.

13. The medium of claim 8, wherein the instructions cause the one or more computing devices to perform operations further comprising:

extracting, from another data packet, additional inventory information associated with the computing asset based on the selected discovery rule set;

generating a digitally-signed updating transaction for the smart contract based on a determination that the extracted additional inventory information is different than the inventory information stored in the smart contract; and causing the plurality of nodes to update the smart contract based on the digitally-signed updating transaction.

14. The medium of claim 8, wherein the operations of determining, selecting, extracting, generating, and communicating are performed in response to receipt of the data packet.

15. A computerized system comprising:
one or more processors,
one or more computer storage media storing computer-usable instructions that, when used by the one or more processors, cause the one or more processors to:
determine a communication protocol associated with a data packet received from a computing asset;
select, from a plurality of discovery rule sets, a discovery rule set associated with the communication protocol;
extract, from the data packet, inventory information associated with the computing asset based on the selected discovery rule set, the extracted inventory information being identified as updateable or non-updateable;
generate a digitally-signed transaction having a smart contract associated with the computing asset for storage on a distributed ledger, the digitally-signed transaction being generated based on the extracted inventory information and based further on a determination that the smart contract does not exist on the distributed ledger, the smart contract including updateable variables corresponding to the updateable inventory information, and non-updateable variables corresponding to the non-updateable inventory information, wherein one of the updateable variables includes a dynamic state variable that assigns an updateable status of the computing asset as active based on the received data packet and one of the non-updateable variables includes a timestamp based on the received data packet;
after the digitally-signed transaction is generated, cause a plurality of nodes to validate the digitally-signed transaction and store the smart contract associated with the computing asset onto the distributed ledger;
generate another digitally-signed transaction to update the updateable status in the dynamic state variable of the smart contract as inactive based on a determination that a threshold amount of time has exceeded the timestamp; and
cause the plurality of nodes to validate the other digitally-signed transaction and change the updateable status as inactive.

16. The system of claim 15, wherein the data packet is received from the computing asset on a network of the computing system, and wherein the generated smart contract includes an attribute that identifies the network.

17. The system of claim 15, wherein the communication protocol is determined based at least in part on header information included in the data packet.

* * * * *